US 10,977,958 B2

(12) United States Patent
Inaguchi et al.

(10) Patent No.: US 10,977,958 B2
(45) Date of Patent: Apr. 13, 2021

(54) GUIDANCE DISPLAY METHOD

(71) Applicant: FANUC CORPORATION, Yamanashi (JP)

(72) Inventors: Yuuzou Inaguchi, Yamanashi-ken (JP); Gaku Isobe, Yamanashi-ken (JP); Yasuaki Koyama, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 285 days.

(21) Appl. No.: 16/038,362

(22) Filed: Jul. 18, 2018

(65) Prior Publication Data
US 2019/0027057 A1  Jan. 24, 2019

(30) Foreign Application Priority Data

Jul. 19, 2017  (JP) .............................. JP2017-139744
Jun. 11, 2018  (JP) .............................. JP2018-110804

(51) Int. Cl.
*G09B 19/00* (2006.01)
*G06F 3/048* (2013.01)
*G06F 3/0488* (2013.01)
*G06F 3/14* (2006.01)

(52) U.S. Cl.
CPC ............. *G09B 19/00* (2013.01); *G06F 3/048* (2013.01); *G06F 3/0488* (2013.01); *G06F 3/14* (2013.01)

(58) Field of Classification Search
CPC ....... G09B 19/00; G06F 3/048; G06F 3/0488; G06F 3/14; B23Q 3/155; B23Q 3/1554
USPC ........................................................ 434/365
See application file for complete search history.

(56) References Cited

U.S. PATENT DOCUMENTS

| 3,994,061 | A | | 11/1976 | Tomita et al. |
| 4,414,732 | A | | 11/1983 | Tomita et al. |
| 5,435,067 | A | | 7/1995 | Uchida et al. |
| 5,933,353 | A | * | 8/1999 | Abriam ............... G05B 19/4097 700/171 |
| 6,112,133 | A | * | 8/2000 | Fishman ........... G05B 19/40937 700/180 |
| 6,236,399 | B1 | * | 5/2001 | Nishiyama ........... G05B 19/409 715/764 |

(Continued)

FOREIGN PATENT DOCUMENTS

CN  102672511 A  9/2012
CN  103370661 A  10/2013

(Continued)

OTHER PUBLICATIONS

Untranslated Decision to Grant a Patent mailed by Japan Patent Office (JPO) for Application No. 2018-110804, dated Nov. 5, 2019, 3 pgs.

(Continued)

*Primary Examiner* — Michael C Grant
(74) *Attorney, Agent, or Firm* — Fredrikson & Byron, P.A.

(57) ABSTRACT

A display unit is controlled to display guidance such as to instruct an operator to move a spindle up and down near the Z-axis position at which the tool is transferred between a grip and the spindle and to observe a lateral movement of the tip of a tool at the same time. Then, when the tip of the tool moves laterally, the display unit is controlled to display guidance to instruct the operator to raise the spindle and turn a turret so as to reduce the lateral movement of the tip of the tool.

2 Claims, 17 Drawing Sheets

(56) References Cited

U.S. PATENT DOCUMENTS

| | | | |
|---|---|---|---|
| 7,175,374 B2 | 2/2007 | Takaku | |
| 7,445,587 B2 | 11/2008 | Kojima et al. | |
| 2007/0163414 A1* | 7/2007 | Senda | B21D 37/145 |
| | | | 83/684 |
| 2008/0082200 A1 | 4/2008 | Ikeda | |
| 2012/0265330 A1* | 10/2012 | Beck | G05B 19/409 |
| | | | 700/95 |
| 2013/0331245 A1 | 12/2013 | Koike et al. | |
| 2016/0187871 A1* | 6/2016 | Yi | G05B 19/4093 |
| | | | 700/173 |
| 2017/0087678 A1 | 3/2017 | Isobe et al. | |
| 2019/0027057 A1* | 1/2019 | Inaguchi | G06F 3/0488 |

FOREIGN PATENT DOCUMENTS

| | | |
|---|---|---|
| CN | 103801967 A | 5/2014 |
| CN | 105855996 A | 8/2016 |
| FR | 2984787 B1 | 1/2014 |
| JP | 1222846 A | 9/1989 |
| JP | 2001232531 A | 8/2001 |
| JP | 2006239854 A | 9/2006 |
| JP | 2009113160 A | 5/2009 |
| JP | 2010140225 A | 6/2010 |
| JP | 2011173197 A | 9/2011 |
| JP | 2011189459 A | 9/2011 |
| JP | 200211632 A | 1/2012 |
| JP | 201286350 A | 5/2012 |
| JP | 4990316 B2 | 8/2012 |
| JP | 2013132706 A | 7/2013 |
| JP | 201551494 A | 3/2015 |
| JP | 201560480 A | 3/2015 |
| JP | 201582285 A | 4/2015 |
| JP | 201596280 A | 5/2015 |
| JP | 201598063 A | 5/2015 |
| JP | 20177030 A | 1/2017 |
| JP | 201839068 A | 3/2018 |

OTHER PUBLICATIONS

English Machine Translation of Decision to Grant a Patent mailed by Japan Patent Office (JPO) for Application No. 2018-110804, dated Nov. 5, 2019, 2 pgs.

Untranslated Notice of Reasons for Refusal mailed by Japan Patent Office (JPO) for Application No. 2018-110804, dated Aug. 20, 2019, 3 pgs.

English Machine Translation of Notice of Reasons for Refusal mailed by Japan Patent Office (JPO) for Application No. 2018-110804, dated Aug. 20, 2019, 3 pgs.

English Abstract and Machine Translation for Japanese Publication No. 2015-082285 A, published Apr. 27, 2015, 14 pgs.

English Abstract and Machine Translation for Japanese Publication No. 2018-039068 A, published Mar. 15, 2018, 13 pgs.

English Abstract and Machine Translation for Chinese Publication No. CN105855996A, published Aug. 17, 2016, 7 pgs.

English Abstract and Machine Translation of French Publication No. 2984787 B1, published Jan. 10, 2014, 11 pgs.

English Machine Translation of Japanese Publication No. 4990316 B2, published Aug. 1, 2012, 6 pgs.

English Abstract and Machine Translation of Chinese Publication No. 102672511 A, published Sep. 19, 2012, 17 pgs.

English Abstract and Machine Translation of Chinese Publication No. 103370661 A, published Oct. 23, 2013, 27 pgs.

English Abstract and Machine Translation of Chinese Publication No. 103801967 A, published May 21, 2014, 10 pgs.

English Abstract and Machine Translation for Japanese Publication No. 2012-086350 A, published May 10, 2012, 10 pgs.

English Abstract and Machine Translation for Japanese Publication No. 2013-132706 A, published Jul. 8, 2013, 11 pgs.

English Abstract and Machine Translation for Japanese Publication No. 2006-239854 A, published Sep. 14, 2006, 11 pgs.

English Abstract and Machine Translation for Japanese Publication No. 2015-060480 A, published Mar. 30, 2015, 14 pgs.

English Abstract and Machine Translation for Japanese Publication No. 2015-098063 A, published May 28, 2015, 6 pgs.

English Abstract and Machine Translation for Japanese Publication No. 2010-140225 A, published Jun. 24, 2010, 11 pgs.

English Abstract and Machine Translation for Japanese Publication No. 2002-011632 A, published Jan. 15, 2002, 6 pgs.

English Abstract and Machine Translation for Japanese Publication No. 2009-113160 A, published May 28, 2009, 10 pgs.

English Abstract and Machine Translation for Japanese Publication No. 2011-189459 A, published Sep. 29, 2011, 9 pgs.

English Abstract and Machine Translation for Japanese Publication No. 2015-051494 A, published Mar. 19, 2015, 14 pgs.

English Abstract and Machine Translation for Japanese Publication No. 2015-096280 A, published May 21, 2015, 13 pgs.

English Abstract and Machine Translation for Japanese Publication No. 2011-173197 A, published Sep. 8, 2011, 19 pgs.

English Abstract and Machine Translation for Japanese Publication No. 2017-007030 A, published Jan. 12, 2017, 15 pgs.

English Abstract and Machine Translation for Japanese Publication No. 2001-232531 A, published Aug. 28, 2001, 9 pgs.

English Abstract and Machine Translation for Japanese Publication No. JPH01-222846 A, published Sep. 6, 1989, 5 pgs.

* cited by examiner

FIG. 12A

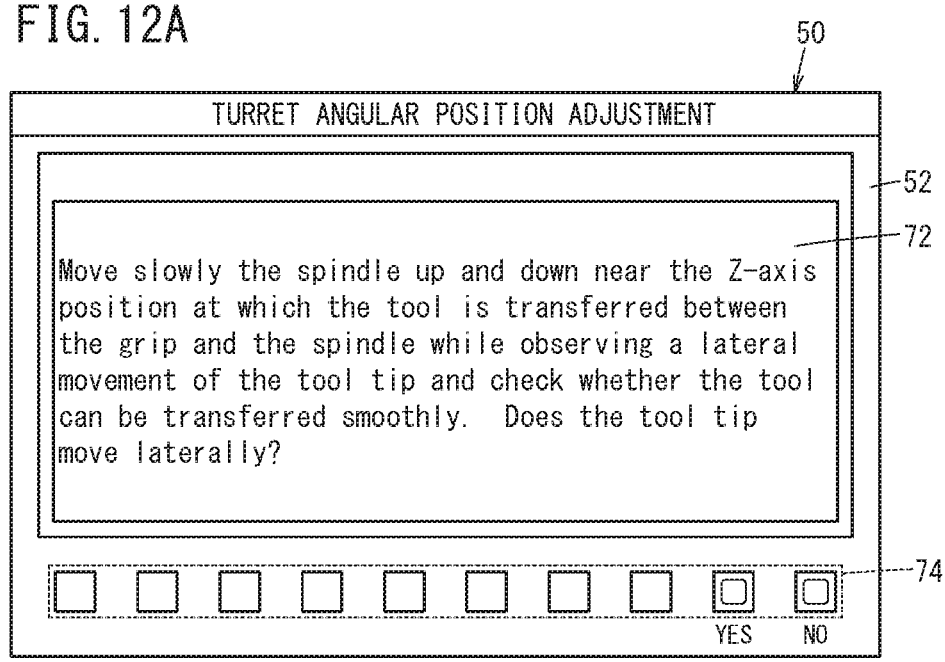

TURRET ANGULAR POSITION ADJUSTMENT

Move slowly the spindle up and down near the Z-axis position at which the tool is transferred between the grip and the spindle while observing a lateral movement of the tool tip and check whether the tool can be transferred smoothly. Does the tool tip move laterally?

YES   NO

FIG. 12B

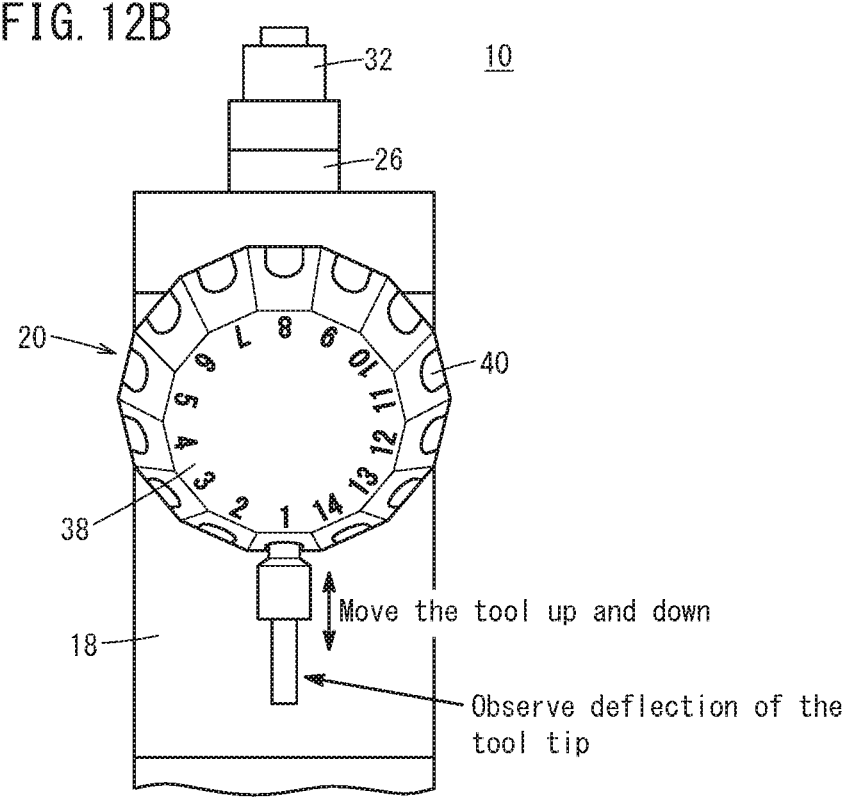

Move the tool up and down

Observe deflection of the tool tip

GUIDANCE DISPLAY METHOD

CROSS-REFERENCE TO RELATED APPLICATION

This application is based upon and claims the benefit of priority from Japanese Patent Applications No. 2017-139744 filed on Jul. 19, 2017 and No. 2018-110804 filed on Jun. 11, 2018, the contents all of which are incorporated herein by reference.

BACKGROUND OF THE INVENTION

Field of the Invention

The present invention relates to a guidance display method for displaying on a display unit guidance on angular position adjustment of a turret to adjust a specific angular position to a predetermined origin, the turret having a plurality of grips for holding tools.

Description of the Related Art

Japanese Laid-Open Patent Publication No. 2015-096280 discloses a machine tool having a tool changer for changing tools of a spindle. The tool changer has a tool magazine for holding tools on grip arms, turns the tool magazine so as to move a desired tool to the spindle tool exchange position, and attaches the desired tool to the spindle.

SUMMARY OF THE INVENTION

According to Japanese Laid-Open Patent Publication No. 2015-096280, the desired tool is moved to the spindle tool changing position by turning the turret (tool magazine). In order to transfer a tool smoothly between the turret and the spindle, the tool on the turret needs to be aligned with the spindle with high accuracy. For this purpose, it is necessary to work out the angular position of the turret with high accuracy. The angular position of the turret is determined based on the amount of rotation from an origin (a reference point) that has been set at a specific angular position of the turret. Though the angular position of the turret is determined by the control device of the machine tool, there may be a case where a deviation occurs between the origin of the turret set in the control device and the origin of the actual turret. In that case, it is necessary to perform recovery of the origin (reference position return) which means that the origin of the turret set in the control device is adjusted to coincide with the actual origin of the turret.

When performing the recovery of the origin, the operator manually adjusts the turret so as to set a predetermined angular position of the turret at the origin, then sets the thus adjusted predetermined angular position of the turret as the origin in the control device. However, since the recovery of the origin is not frequently performed and the procedure of the angular position adjustment is complicated, the recovery of the origin has been a difficult task for the operator.

The present invention has been devised to solve the above problems, and it is therefore an object of the present invention to provide a guidance display method which provides information enabling the operator to easily perform angular position adjustment so as to set a predetermined angular position of a turret at the origin.

According to the aspect of the present invention, a guidance display method of causing a display unit to display instructions for an angular position adjustment method for adjusting a predetermined angular position of a turret provided with a plurality of grips holding a tool so that the predetermined angular position becomes a predetermined origin, includes: a first step of causing the display unit to display such guidance as to instruct an operator to move a spindle up and down near a position at which the tool is transferred between a predetermined grip of the grips and the spindle and to observe runout of the tool tip; when the runout of the tool tip is observed, a second step of causing the display unit to display such guidance as to instruct the operator to raise the spindle up to a turret rotatable position where the turret rotates while the tool attached to the turret does not interference with the spindle; and a third step of causing the display unit to display such guidance as to instruct the operator to turn the turret so as to reduce the runout of the tool tip.

According to the present invention, it is possible to provide information that enables the operator to easily perform angular position adjustment so as to set the predetermined angular position of the turret to the origin.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 12A is a diagram showing a state in which an angular position adjustment screen (1) is displayed on the display unit;

FIG. 12B is a diagram showing the state of the machine tool after an operation is performed by the operator based on the angular position adjustment screen (1);

DESCRIPTION OF THE PREFERRED EMBODIMENTS

First Embodiment

[Configuration of Machine Tool]

Figure 1:
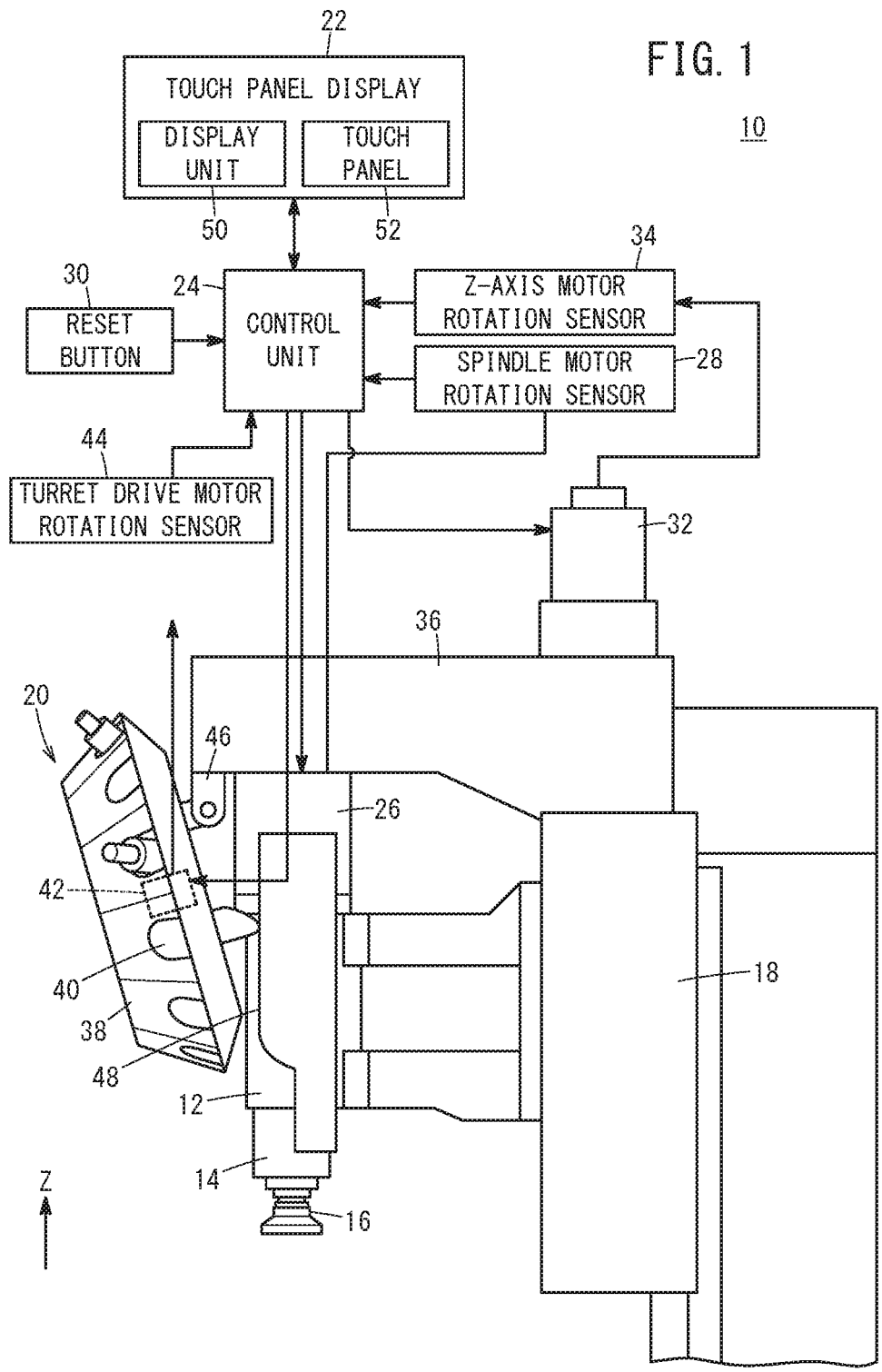
FIG. 1 is a schematic diagram showing the vicinity of a spindle head of a machine tool.

A machine tool 10 of a first embodiment will be described. FIG. 1 is a schematic diagram of the vicinity of a spindle head 12 of the machine tool 10. The machine tool 10 is a vertical machining center and machines an unillustrated workpiece with a tool 16 attached to a spindle 14 by moving downward the spindle head 12 that rotationally supports the spindle 14. The following description will be given with reference to FIG. 1 on the assumption that the vertical direction is the Z-axis, the upward direction is the positive direction and the downward direction is the negative direction.

The machine tool 10 has the spindle 14, the spindle head 12, a column 18, a tool changer 20, a touch panel display 22, and a control unit 24. The spindle 14 is provided on the spindle head 12 so as to be rotatable about a rotational axis parallel to the Z-axis. The spindle head 12 is provided with a spindle motor 26, which rotationally drive the spindle 14. The rotational position of the spindle motor 26 is detected by a spindle motor rotation sensor 28. A tool 16 is detachably mounted in an unillustrated attachment hole formed at the front end of the spindle 14. The tool 16 rotates as the spindle 14 turns.

The spindle head 12 is arranged on the column 18 so as to be movable in the Z-axis direction. The spindle head 12 is joined to an unillustrated nut of a ball screw assembly in the column 18 so as to be integrally movable with the nut. As the unillustrated screw shaft of the ball screw is rotationally driven by a Z-axis motor 32, the spindle head 12 and the spindle 14 move together with the nut in the Z-axis direction. The rotational position of a Z-axis motor 32 is detected by a Z-axis motor rotation sensor 34.

The tool changer 20 is arranged on an arm 36 that extends horizontally from the column 18. The tool changer 20 is a device for automatically changing tools 16 to be attached to the spindle 14. The tool changer 20 includes a turret 38 rotatably attached to the arm 36. On the outer peripheral side of the turret 38 a plurality of grips 40 are provided at regular intervals in the circumferential direction. Each grip 40 detachably holds a tool 16. The turret 38 is coupled to the turret drive motor 42 via an unillustrated reducer and rotated by the turret drive motor 42. The rotational position of the turret drive motor 42 is detected by a turret drive motor rotation sensor 44. The turret 38 is arranged so as to be pivotable (swingable) about a joint 46 of the arm 36. A cam 48 for swinging the turret 38 is provided for the spindle head 12.

The touch panel display 22 includes a display unit 50 and a touch panel 52. The display unit 50 is, for example, a liquid crystal display or the like, on which characters, symbols, numerals, images and the like are displayed. The touch panel 52 is a transparent sheet-like member mounted on the screen of the display unit 50, and is, for example, a resistive touch panel. The touch panel 52 detects the position at which the touch panel 52 is pressed by the operator's finger, the pen or the like, as the coordinates on the coordinate plane set on the touch panel 52, and outputs the position. A display monitor as a display device and a keyboard, a mouse and others as input devices may be used instead of the touch panel display 22.

Figure 2:
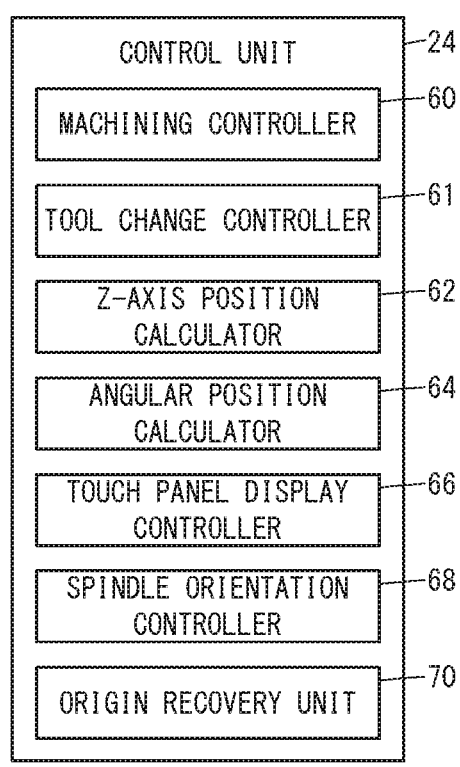
FIG. 2 is a block diagram showing a functional configuration of a control unit.

FIG. 2 is a block diagram showing a functional configuration of the control unit 24. The control unit 24 includes a machining controller 60, a tool change controller 61, a Z-axis position calculator 62, an angular position calculator 64, a touch panel display controller 66, a spindle orientation controller 68, and an origin recovery unit 70.

The machining controller 60 controls the spindle motor 26, the Z-axis motor 32, and unillustrated X-axis and Y-axis motors for driving a worktable so as cut with the tool 16 a workpiece into a shape prescribed in the NC program.

The tool change controller 61 controls the Z-axis motor 32 and the turret drive motor 42 so as to replace the tool 16 attached to the spindle 14 with a desired tool 16. When replacing the tool 16 attached to the spindle 14, the Z-axis motor 32 is controlled so as to move the spindle 14 to the spindle tool exchange position. Although the spindle tool exchange position varies depending on the model of the machine tool 10, in the present embodiment it is set at around +30 mm in terms of the Z-axis position of the spindle 14. When the spindle 14 moves from the negative direction side of the Z-axis to the spindle exchange position, the turret 38 swings along the cam 48, and an empty grip 40 with no tool 16 attached moves to the position under the spindle 14. At this time, the grip 40 catches the tool 16 attached to the spindle 14.

Then, the tool change controller 61 controls the Z-axis motor 32 so as to move the spindle 14 to a rotatable position. The rotatable position varies depending on the model of the machine tool 10 but in the present embodiment it is set at around +115 mm in terms of the Z-axis position of the spindle 14. At this position, the tool 16 is completely removed from the spindle 14, and the turret 38 can rotate with the tool 16 attached to the turret 38 not interfering with the spindle head 12 and the spindle 14.

Next, the tool change controller 61 controls the turret drive motor 42 to turn the turret 38 and put a grip 40 having a desired tool 16 at the tool change angular position. The tool exchange angular position is a position where the grip 40 and the spindle 14 coincide with each other along the direction in which the turret 38 rotates.

Then, the tool change controller 61 controls the Z-axis motor 32 so as to move the spindle 14 to the spindle tool exchange position. As a result, the desired tool 16 is attached to the spindle 14 while being held by the grip 40.

Thereafter, the tool change controller 61 controls the Z-axis motor 32 so as to set the spindle 14 at +0 mm in terms of the Z-axis position. As the spindle 14 moves from the spindle exchange position to the Z-axis position of +0 mm, the turret 38 swings along the cam 48 while the grip 40 releases the gripping of the tool 16 and moves in a direction away from the spindle 14.

The Z-axis position calculator 62 receives input of the rotational position of the Z-axis motor 32 from the Z-axis motor rotation sensor 34 and calculates the position of the spindle 14 on the Z-axis from the rotational position of the Z-axis motor 32.

The angular position calculator 64 receives the rotational position of the turret drive motor 42 from the turret drive motor rotation sensor 44 and calculates the angular position of the turret 38 from the rotational position of the turret drive motor 42. The angular position calculator 64 has been provided with a specific angular position of the turret 38 as the origin and calculates the angular position of the turret 38 based on the amount of rotation relative to the origin. The specific angular position of the turret 38 is an angular position at which a reference grip 40 (for example, the first grip 40) and the spindle 14 coincide with each along the direction in which the turret 38 rotates. The angular position calculator 64 calculates the angular position of the turret 38 in the range of 0° to 360° with the origin at 0°.

The touch panel display controller 66 controls the display unit 50 to display characters, symbols, numerals, images and the like on the screen. The touch panel display controller 66 receives from the touch panel 52 input of the coordinates of a position at which the touch panel 52 is pressed with the operator's finger, pen or the like, and accepts the operation associated with the input coordinates.

The spindle orientation controller 68 controls the spindle motor 26 so as to stop the spindle 14 at a predetermined rotational position (spindle orientation). When a reset button 30 is operated by the operator, the spindle orientation controller 68 releases (terminates) the spindle orientation.

The origin recovery unit 70 recovers the origin when the origin of the angular position of the turret 38 set in the angular position calculator 64 has deviated from the origin of the angular position of the actual turret 38. Specifically, the operator adjusts the angular position so that the predetermined angular position of the turret 38 becomes the origin, and the origin recovery unit 70 sets in the angular position calculator 64 the angular position of the turret 38 at that time as the origin of the angular position of the turret 38.

[About Origin Restoration]

The tool changer 20 turns the turret 38 to move the grip 40 holding a desired tool 16 to the spindle tool exchange position and transfers the tool 16 from the grip 40 to the spindle 14 at the spindle tool exchange position. In order to smoothly transfer the tool 16 between the grip 40 and the spindle 14, it is desirable that, at the spindle tool exchange position, the grip 40 and the spindle 14 coincide with each other in the direction in which the turret 38 rotates, and thus high positioning accuracy is required for the angular position of the turret 38.

As described above, the angular position calculator 64 calculates the angular position of the turret 38 based on the amount of rotation about the origin of the angular position of the turret 38. In a case where the machine tool 10 has been used for a long time, the origin of the angular position of the turret 38 set in the angular position calculator 64 may deviate from an actual origin of the angular position of the turret 38. As a result, the angular position of the turret 38 calculated by the angular position calculator 64 also deviates from an actual angular position of the turret 38.

To deal with this, it is necessary to restore the origin so that the origin of the angular position of the turret 38 set in the angular position calculator 64 coincides with the actual origin of the angular position of the turret 38.

In the origin recovery, first, the operator manually turns the turret 38 and performs angular position adjustment so that the angular position of the turret 38 is the origin. Then, in the origin recovery unit 70, the angular position of the turret 38 at that time is set as the origin in the angular position calculator 64.

[Guidance Display]

In the origin recovery, as described above, the operator needs to manually rotate the turret 38 and perform angular position adjustment so that the angular position of the turret 38 coincides with the origin. In the present embodiment, when the operator performs angular position adjustment, the display unit 50 displays on the display unit 50 how to perform angular position adjustment.

Figure 3:
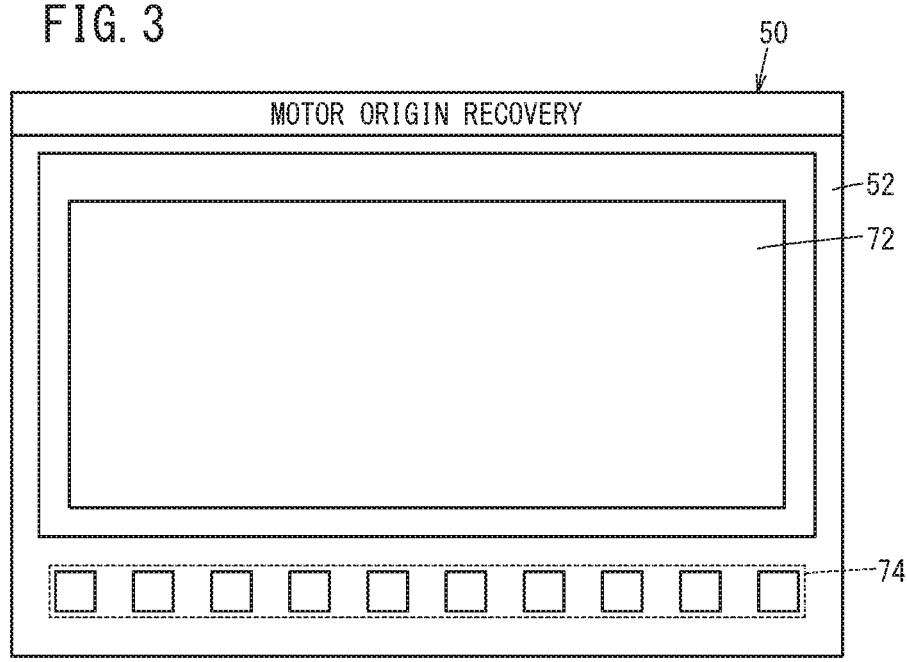
FIG. 3 is a diagram showing an example of guidance displayed on a display unit.

FIG. 3 is a diagram showing an example of guidance displayed on the display unit 50. The screen of the display unit 50 has a guidance display pane 72 and a function button display area 74. In the guidance display pane 72, the angular position adjustment method is displayed step by step. The function button display area 74 includes, for example, a [NEXT] button for switching the display in the guidance display pane 72 to the display of the next step and a [PREV] button for switching to the display of the previous step. For example, when the operator presses the touch panel 52 at a position corresponding to the position where the [NEXT] button in the function button display area 74 is displayed, the touch panel display controller 66 determines that the [NEXT] button is operated.

Figure 4:
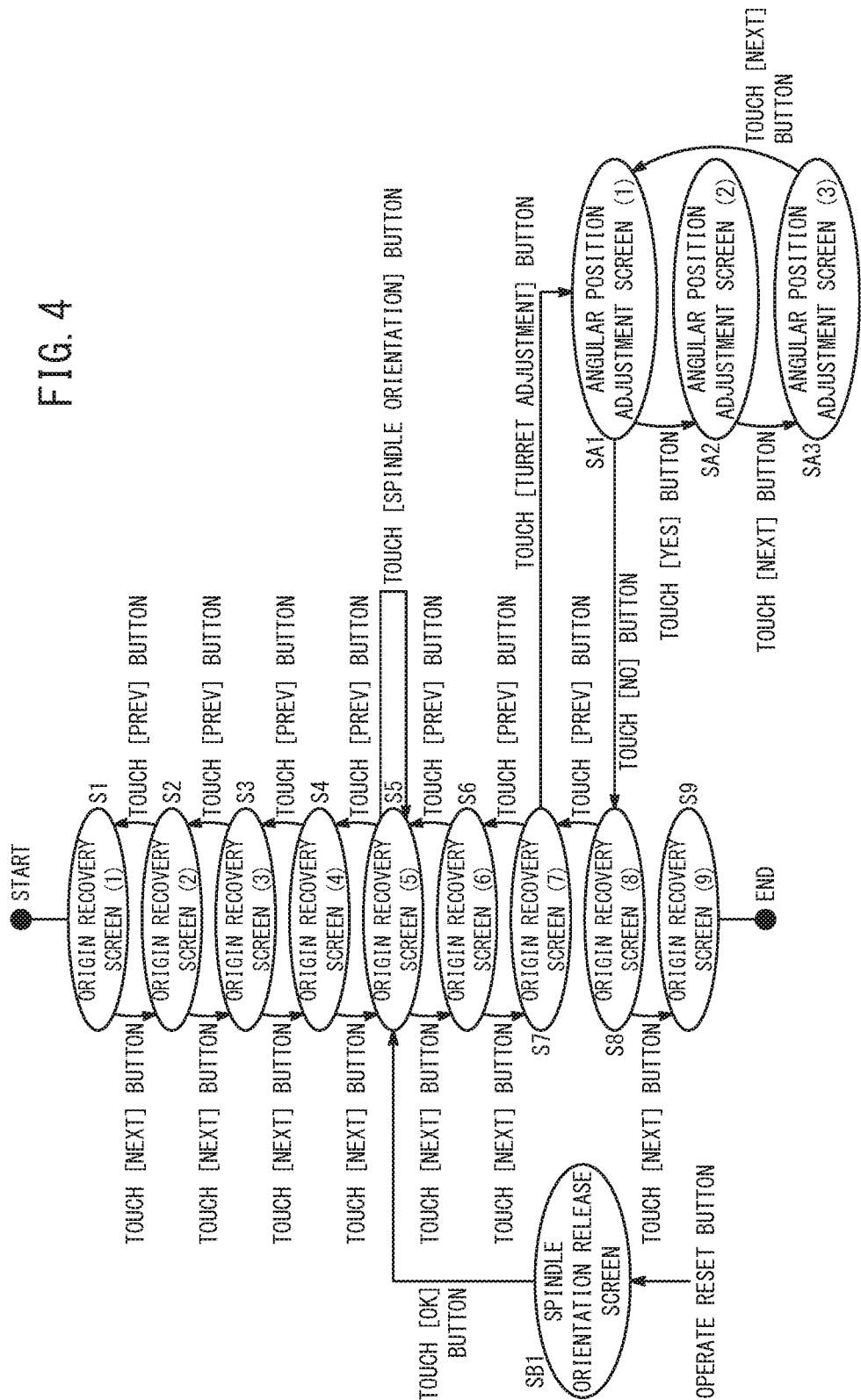
FIG. 4 is a state transition diagram showing how the states of the screen to be displayed on the display unit transition under the control of a touch panel display controller.
Figure 5A:
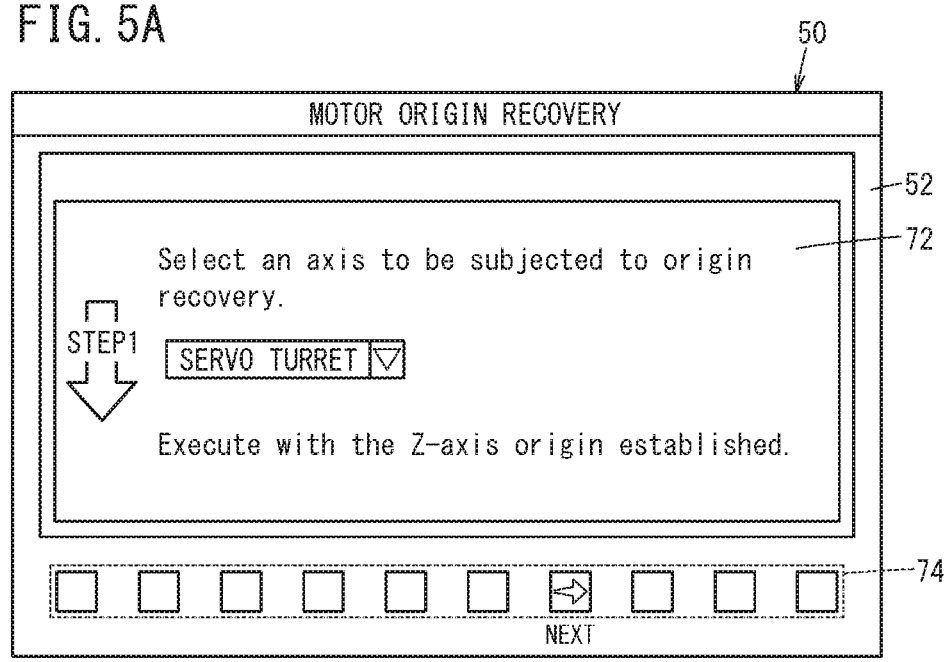
FIG. 5A is a diagram showing a state in which an origin recovery screen (1) is displayed on the display unit.
Figure 5B:
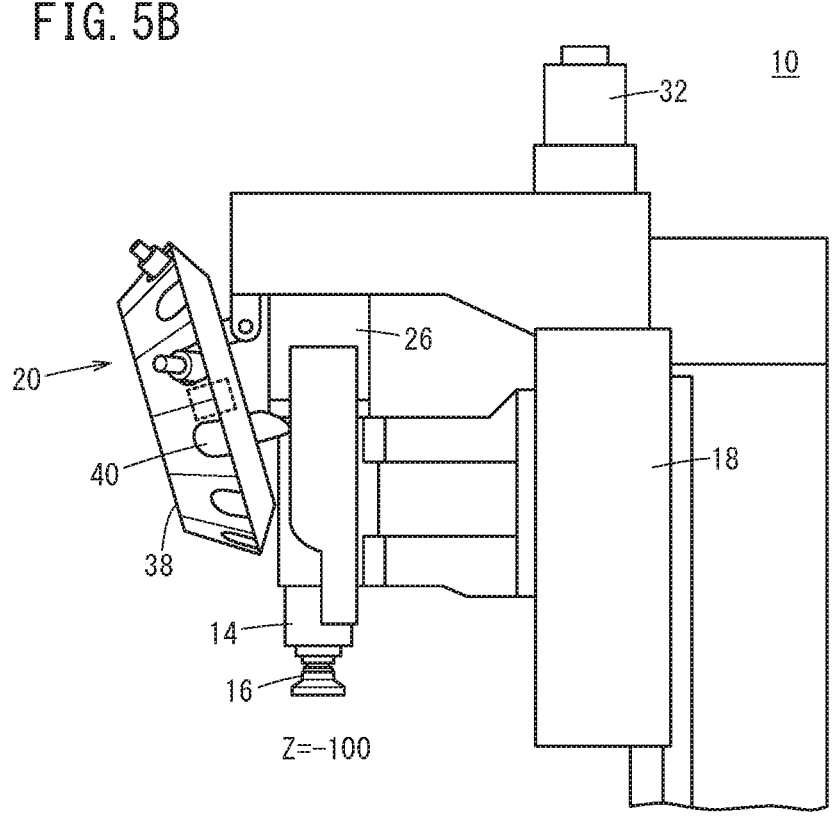
FIG. 5B is a diagram showing the state of the machine tool after an operation has been performed by the operator in accordance with the origin recovery screen (1)

FIG. 4 is a state transition diagram showing how the states of the screen to be displayed on the display unit 50 transition under the control of the touch panel display controller 66. At the start of guidance, the screen state transitions to a state S1. In the state S1, the touch panel display controller 66 causes the display unit 50 to display an origin recovery screen (1). FIG. 5A is a diagram showing a state where the origin recovery screen (1) is displayed on the display unit 50. FIG. 5B is a diagram showing the state of the machine tool 10 after an operation has been performed by the operator in accordance with the origin recovery screen (1).

On the origin recovery screen (1), the guidance display pane 72 displays a message "Select an axis to be subjected to origin recovery" with a pull-down list on the line below, as shown in FIG. 5A. The pull-down list allows the X-axis, Y-axis, Z-axis, etc. to be selected as well as the servo turret displayed in FIG. 5A. When the servo turret is selected from the pull-down list by the operator operating the touch panel 52, the angular position adjustment method of the turret 38 will be displayed on the subsequent screens of the display unit 50. Though not described below, when, for example, the operator selects the Z-axis from the pull-down list by operating the touch panel 52, a Z-axis position adjustment method for designating the origin of the spindle 14 with respect to the Z-direction are displayed on the subsequent screens of the display unit 50.

On the origin recovery screen (1), when the servo turret is selected in the pull-down list, a message "Execute with the Z-axis origin established" is displayed on the line under the pull-down list. This display instructs the operator to perform angular position adjustment of the torrent 38 after completion of an origin recovering process with respect to the Z-axis for coinciding the origin point of the spindle 14 on the Z-axis set by the Z-axis position calculator 62 with the origin point of the spindle 14 on the machine coordinate in the Z-axis direction.

On the origin recovery screen (1), as shown in FIG. 5A, a [NEXT] button is displayed in the function button display area 74. When the touch panel display controller 66 recognizes an operator's touch to the [NEXT] button on the origin recovery screen (1), the current display switches to a state S2 (FIG. 4).

Figure 6A:
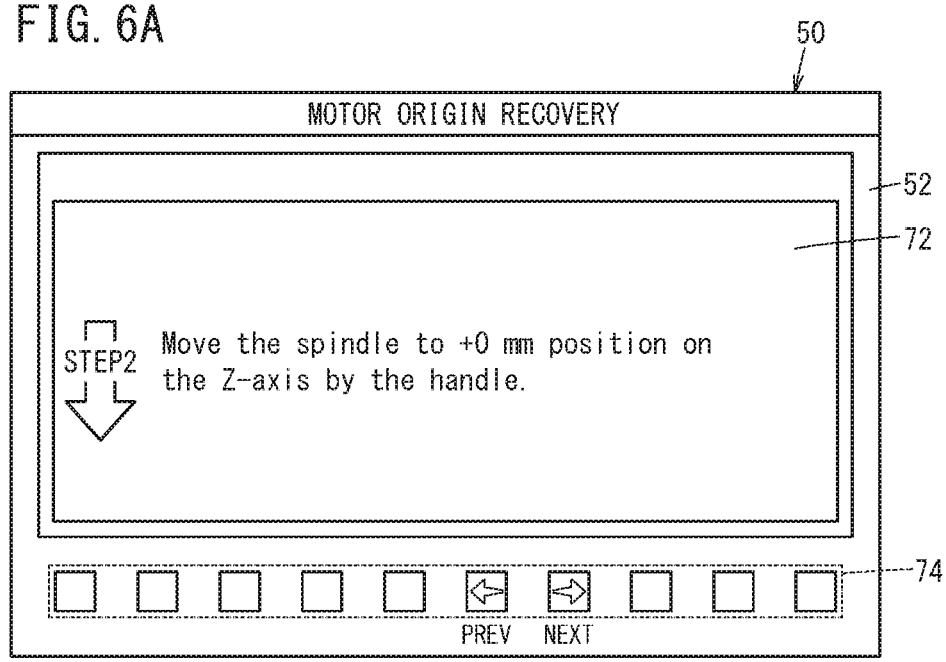
FIG. 6A is a diagram showing a state in which an origin recovery screen (2) is displayed on the display unit.
Figure 6B:
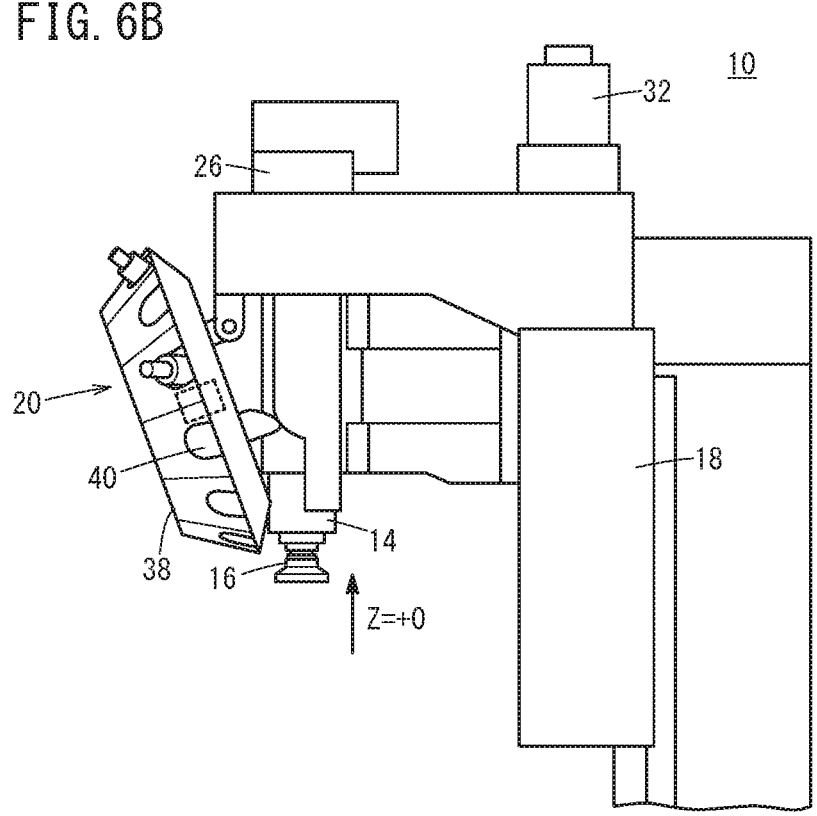
FIG. 6B is a diagram showing the state of the machine tool after an operation has been performed by the operator in accordance with the origin recovery screen (2)

In the state S2, the touch panel display controller 66 causes the display unit 50 to display an origin recovery screen (2). FIG. 6A is a diagram showing a state where the origin recovery screen (2) is displayed on the display unit 50. FIG. 6B is a diagram showing the state of the machine tool 10 after an operation has been performed by the operator in accordance with the origin recovery screen (2).

On the origin recovery screen (2), as shown in FIG. 6A, the guidance display pane 72 displays a message "Move the spindle to +0 mm position on the Z-axis with the handle" is displayed. This display instructs the operator to operate an unillustrated handle provided for the machine tool 10 and move the spindle 14 to the +0 mm position on the Z-axis.

On the origin recovery screen (2), as shown in FIG. 6A, [PREV] and [NEXT] buttons are displayed in the function button display area 74. Here, the [NEXT] button is not activated until the spindle 14 comes to the vicinity of the position of +0 mm on the Z-axis so that even if the [NEXT] button is operated by the operator, the touch panel display controller 66 will not recognize the operation of [NEXT] button.

When the touch panel display controller 66 recognizes that the operator has operated the [PREV] button in the origin recovery screen (2), the current display switches to the state S1 (FIG. 4). On the other hand, when the touch panel display controller 66 recognizes an operator's touch to the [NEXT] button on the origin recovery screen (2), the current display switches to a state S3 (FIG. 4).

Figure 7A:
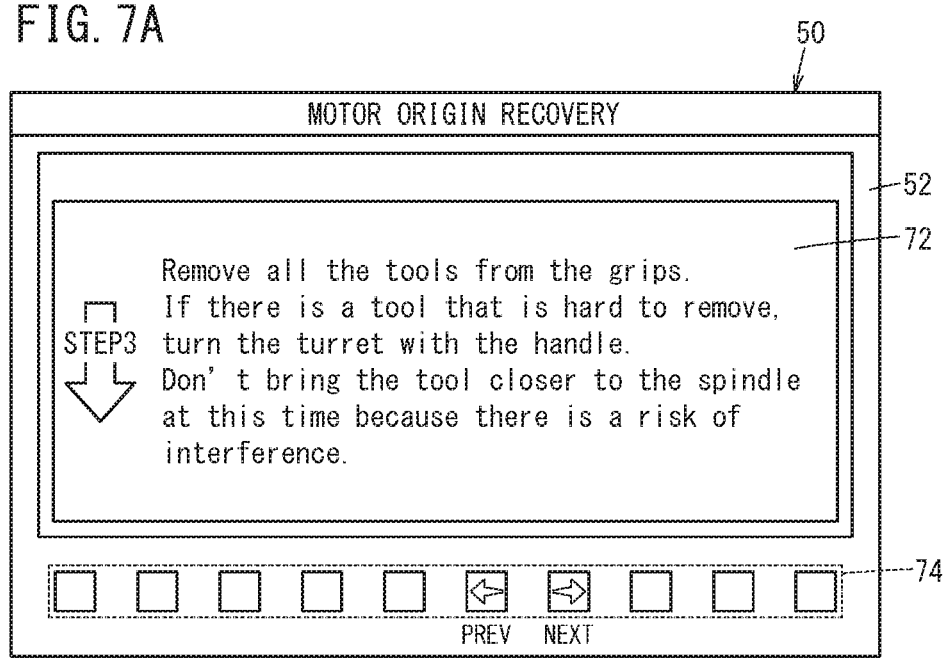
FIG. 7A is a diagram showing a state in which an origin recovery screen (3) is displayed on the display unit.
Figure 7B:
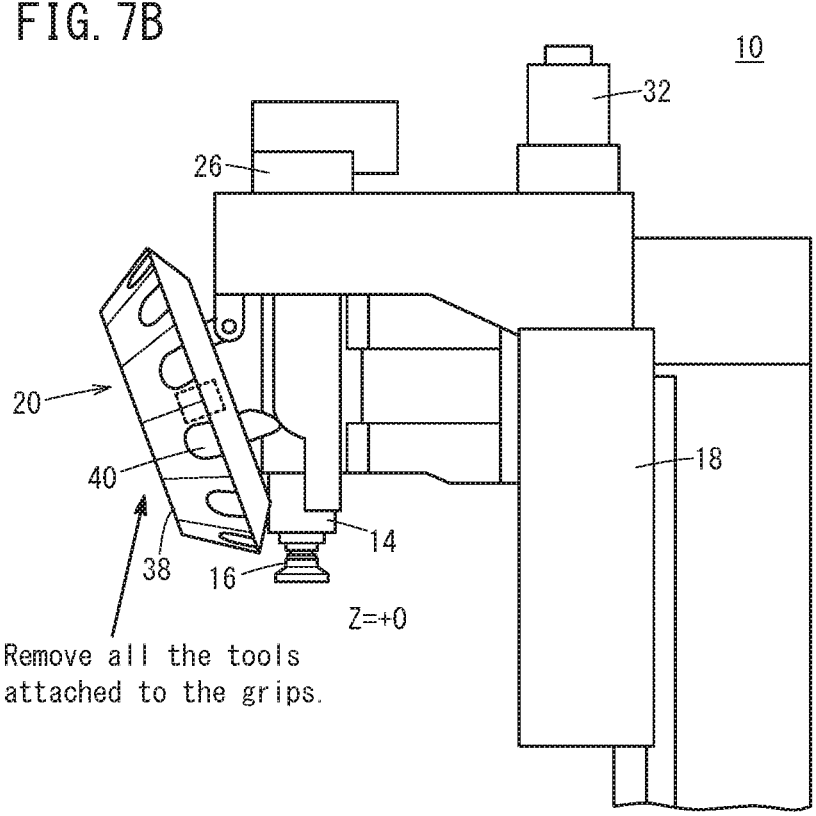
FIG. 7B is a diagram showing the state of the machine tool after an operation has been performed by the operator in accordance with the origin recovery screen (3)

In the state S3, the touch panel display controller 66 causes the display unit 50 to display the origin recovery screen (3). FIG. 7A is a diagram showing a state in which the origin recovery screen (3) is displayed on the display unit 50. FIG. 7B is a diagram showing the state of the machine tool 10 after an operation has been performed by the operator in accordance with the origin recovery screen (3).

On the origin recovery screen (3), as shown in FIG. 7A, the guidance display pane 72 displays a message "Remove all the tools from the grips. If there is a tool that is difficult to remove, turn the turret with the handle. Don't bring the tool closer to the spindle at this time because there is a risk of interference". This display instructs the operator to remove all the tools 16 attached to the grip 40. This instruction is given in order to eliminate deviation of the center of gravity of the turret 38 due to the tools 16 attached to the grips 40 and prevent deterioration in accuracy of the angular position adjustment of the turret 38.

On the origin recovery screen (3), as shown in FIG. 7A, [PREV] and [NEXT] buttons are displayed in the function button display area 74. When the touch panel display controller 66 recognizes an operator's touch to the [PREV] button on the origin recovery screen (3), the current display switches to the state S2 (FIG. 4). On the other hand, when the touch panel display controller 66 recognizes an operator's touch to the [NEXT] button on the origin recovery screen (3), the current display switches to the state S4 (FIG. 4).

Figure 8A:
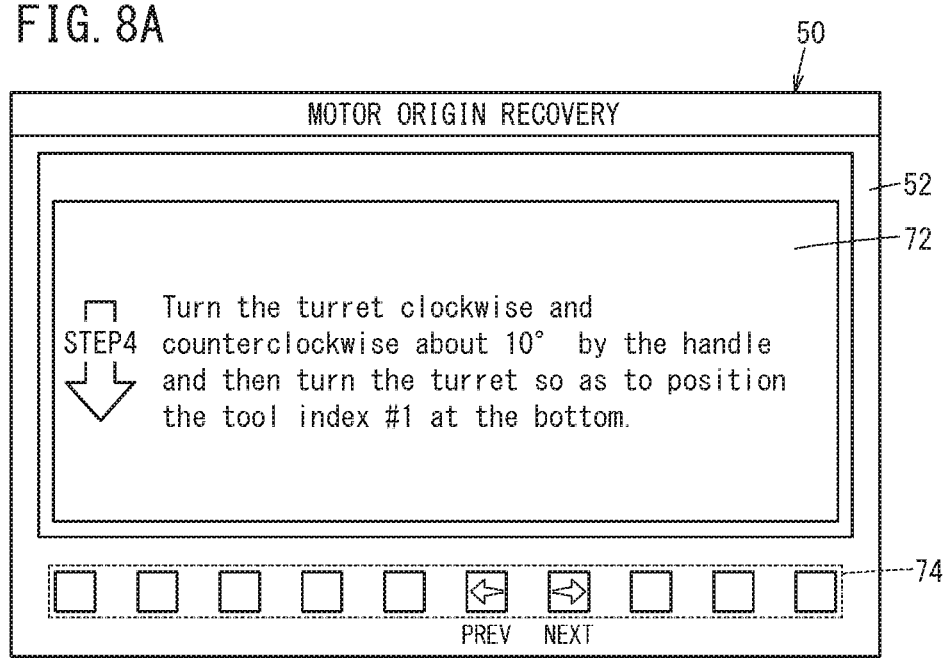
FIG. 8A is a diagram showing a state in which an origin recovery screen (4) is displayed on the display unit.
Figure 8B:
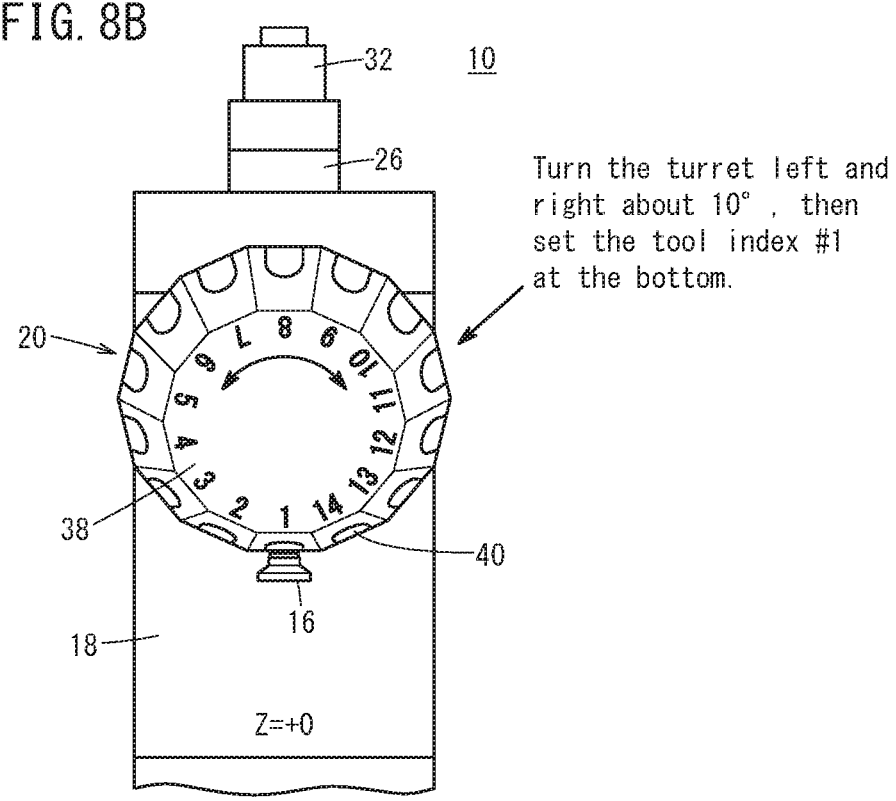
FIG. 8B is a diagram showing the state of the machine tool after an operation has been performed by the operator in accordance with the origin recovery screen (4)

In the state S4, the touch panel display controller 66 causes the display unit 50 to display the origin recovery screen (4). FIG. 8A is a diagram showing a state in which the origin recovery screen (4) is displayed on the display unit 50. FIG. 8B is a diagram showing the state of the machine tool 10 after an operation has been performed by the operator in accordance with the origin recovery screen (4).

Displayed on the origin recovery screen (4) is, as shown in FIG. 8A, a message "Turn the turret clockwise and counterclockwise about 10° with the handle and then turn the turret so as to position the tool index #1 at the bottom". This display instructs the operator to manipulate the unillustrated handle provided on the machine tool 10 to turn the turret 38 about 10° leftward and rightward and then set the turret so that the tool index #1 on the face of the turret 38 is positioned at the bottom. Rotating the turret 38 about 10° leftward and rightward causes the turret drive motor 42 coupled with the turret 38 via the reduction gear to turn more than one rotation, so that the motor can regain information on the rotational reference position unique to each motor even if the motor has lost the information.

On the origin recovery screen (4), as shown in FIG. 8A, [PREV] and [NEXT] buttons are displayed in the function button display area 74. When the touch panel display controller 66 recognizes an operator's touch to the [PREV] button on the origin recovery screen (4), the current display switches to the state S3 (FIG. 4). On the other hand, when the touch panel display controller 66 recognizes an operator's touch to the [NEXT] button on the origin recovery screen (4), the current display switches to a state S5 (FIG. 4).

Figure 9:
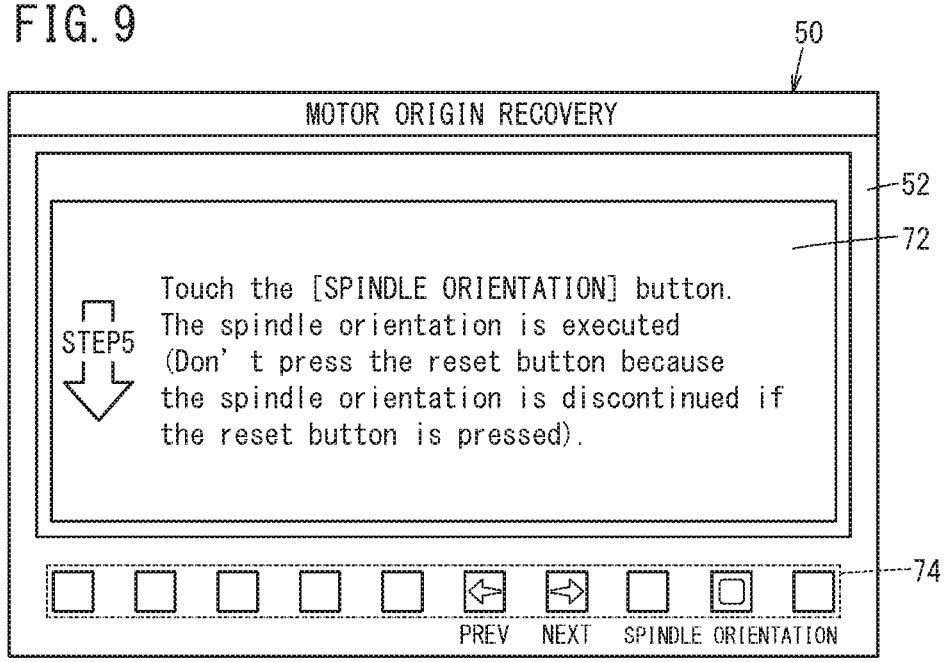
FIG. 9 is a diagram showing a state in which an origin recovery screen (5) is displayed on the display unit.

In the state S5, the touch panel display controller 66 causes the display unit 50 to display the origin recovery screen (5). FIG. 9 is a diagram showing a state where the origin recovery screen (5) is displayed on the display unit 50.

On the origin recovery screen (5), as shown in FIG. 9, the guidance display pane 72 displays a message "Touch the [SPINDLE ORIENTATION] button. The spindle orientation is executed (Don't press the reset button because the spindle orientation is discontinued if the reset button is pressed)". This display instructs the operator to operate the [SPINDLE ORIENTATION] button displayed in the function button display area 74.

On the origin recovery screen (5), as shown in FIG. 9, [PREV], [NEXT], and [SPINDLE ORIENTATION] buttons are displayed in the function button display area 74. Here, the [NEXT] button is not activated until the spindle orientation, which is described later, is effected, so that even if the [NEXT] button is operated by the operator, the touch panel display controller 66 will not recognize the operation of [NEXT] button.

When the touch panel display controller 66 recognizes an operator's touch to the [SPINDLE ORIENTATION] button on the origin recovery screen (5), the spindle orientation controller 68 performs the spindle orientation. The spindle orientation controller 68 controls the spindle motor 26 so as to stop the spindle 14 at a rotational position where the position of the key of the tool 16 attached to the spindle 14 coincides with the position of the keyway of the grip 40. It should be noted that the spindle orientation is always performed when the display is in states S6 to S8 and SA1 to SA3 described later.

When the touch panel display controller 66 recognizes an operator' touch to the [PREV] button in the origin recovery screen (5), the current display switches to the state S4 (FIG. 4). On the other hand, when the touch panel display controller 66 recognizes an operator's touch to the [NEXT] button on the origin recovery screen (5), the current display transitions to a state S6 (FIG. 4).

Figure 10A:
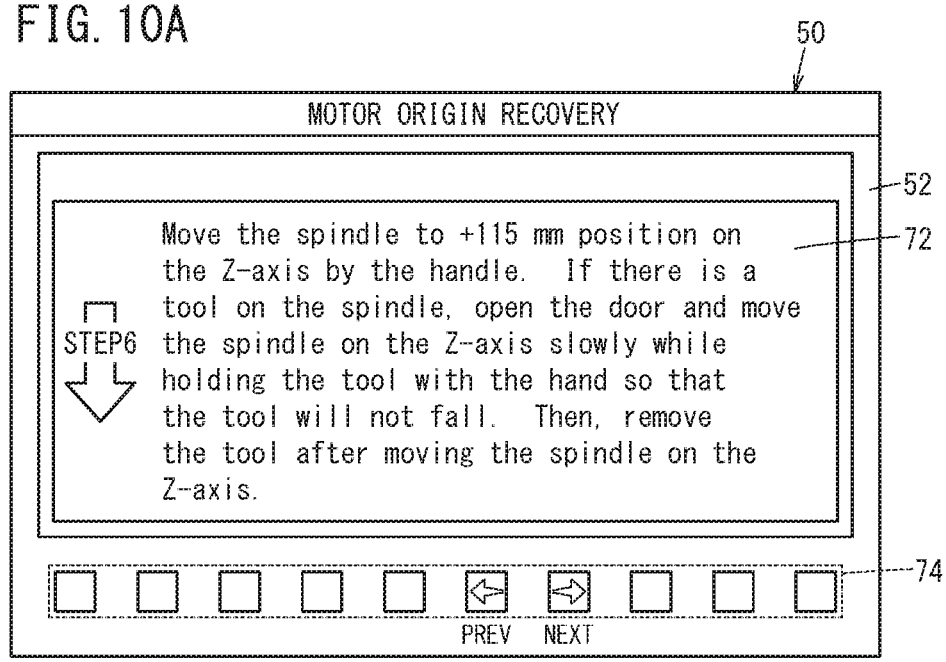
FIG. 10A is a diagram showing a state in which an origin recovery screen (6) is displayed on the display unit.
Figure 10B:
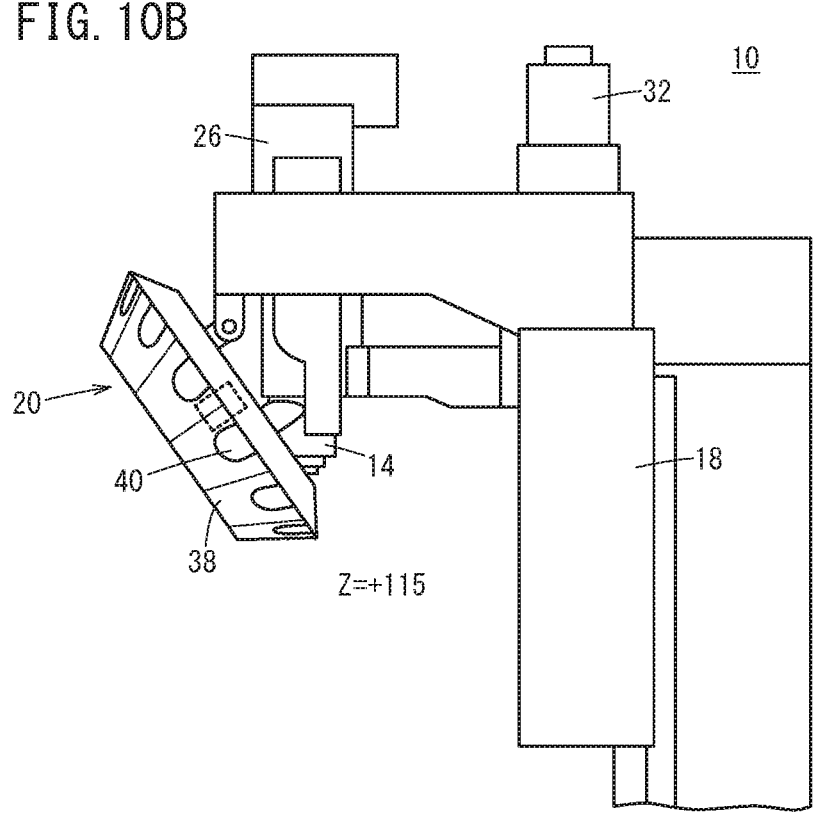
FIG. 10B is a diagram showing the state of the machine tool after an operation has been performed by the operator in accordance with the origin recovery screen (6)

In the state S6, the touch panel display controller 66 causes the display unit 50 to display an origin recovery screen (6). FIG. 10A is a diagram showing a state where the origin recovery screen (6) is displayed on the display unit 50. FIG. 10B is a diagram showing the state of the machine tool 10 after an operation has been performed by the operator in accordance with the origin recovery screen (6).

On the origin recovery screen (6), as shown in FIG. 10A, the guidance display pane 72 displays a message "Move the spindle to +115 mm position on the Z-axis with the handle. If there is a tool attached to the spindle, open the door and move the spindle on the Z-axis slowly while holding the tool with the hand so that the tool will not fall. Then, remove the tool after moving the spindle on the Z-axis". This display instructs the operator to operate the unillustrated handle provided for the machine tool 10 to move the spindle 14 on the Z-axis to the turret rotatable position where the turret 38 is permitted to turn (Z=around +115 mm).

When the spindle 14 having a tool 16 attached thereto passes through the spindle tool exchange position (+30 mm) while moving from +0 mm to +115 mm in terms of the Z-axis position, the tool 16 is transferred from the spindle 14 to the grip 40. When the spindle 14 moves to the position where the turret 38 is permitted to turn, the tool 16 is totally removed from the spindle 14, so that the operator can easily attach and detach the tool 16 to and from the grip 40. When the operator removes the tool 16 from the grip 40, none of the grips 40 and the spindle 14 has any tool 16 attached thereto.

On the origin recovery screen (6), as shown in FIG. 10A, [PREV] and [NEXT] buttons are displayed in the function button display area 74. Here, the [NEXT] button is not activated until the spindle 14 comes to the vicinity of the position of +115 mm on the Z-axis so that even if the [NEXT] button is operated by the operator, the touch panel display controller 66 will not recognize the operation of [NEXT] button.

When the touch panel display controller 66 recognizes an operator's touch to the [PREV] button on the origin recovery screen (6), the current display switches to the state S5 (FIG. 4). On the other hand, when the touch panel display controller 66 recognizes an operator's touch to the [NEXT] button on the origin recovery screen (6), the current display transitions to a state S7 (FIG. 4).

Figure 11A:
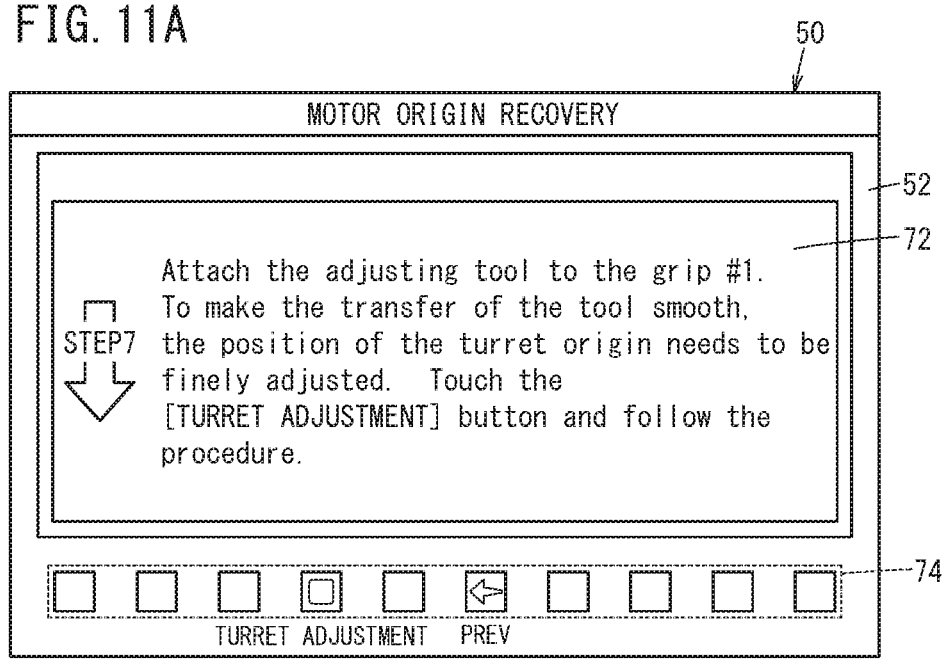
FIG. 11A is a diagram showing a state in which an origin recovery screen (7) is displayed on the display unit.
Figure 11B:
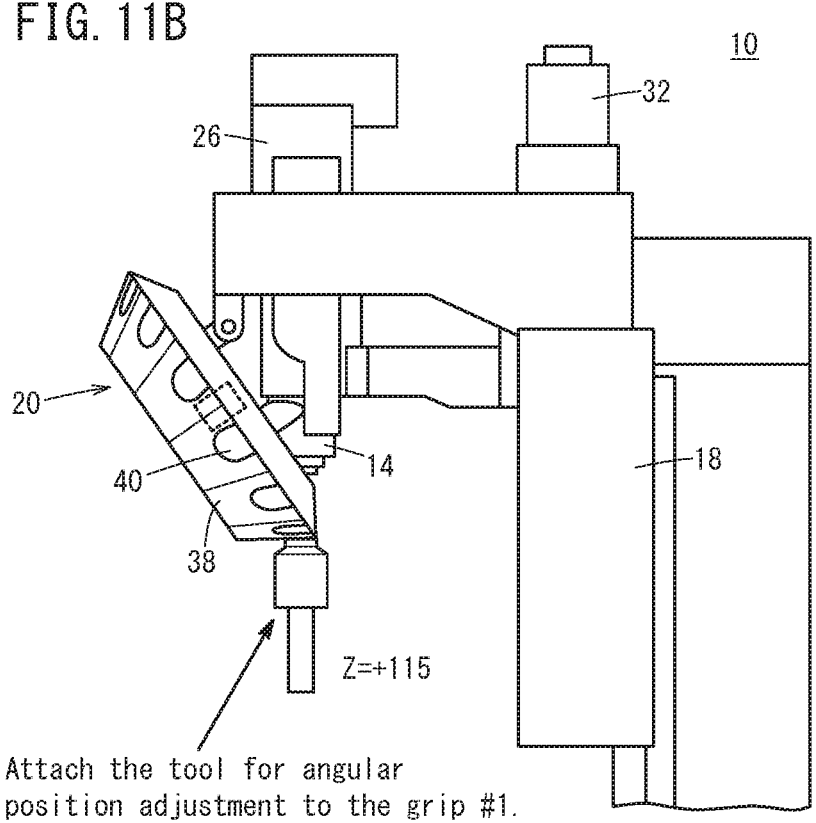
FIG. 11B is a diagram showing the state of the machine tool after an operation has been performed by the operator in accordance with the origin recovery screen (7)

In the state S7, the touch panel display controller 66 causes the display unit 50 to display an origin recovery screen (7). FIG. 11A is a diagram showing a state in which the origin recovery screen (7) is displayed on the display unit 50. FIG. 11B is a diagram showing the state of the machine tool 10 after an operation has been performed by the operator in accordance with the origin recovery screen (7).

On the origin recovery screen (7), as shown in FIG. 11A, the guidance display pane 72 displays a message "Attach to the grip #1 a tool designed for adjustment. To transfer the tool smoothly, the position of the turret origin is adjusted. Touch the [TURRET ADJUSTMENT] button and follow the procedure". This display instructs the operator to attach the angular position adjusting tool 16 to the grip #1 of the grips 40 of the turret 38. Then, the operator is instructed to operate the [TURRET ADJUSTMENT] button displayed in the function button display area 74.

On the origin recovery screen (7), as shown in FIG. 11A, [PREV] and [TURRET ADJUSTMENT] buttons are displayed in the function button display area 74. When the touch panel display controller 66 recognizes an operator's touch to the [PREV] button on the origin recovery screen (7), the current display transitions to the state S6 (FIG. 4). When the touch panel display controller 66 recognizes an operator's touch to the [TURRET ADJUSTMENT] button on the origin recovery screen (7), the current display switches to a state SA1 (FIG. 4).

In the state SA1, the touch panel display controller 66 causes the display unit 50 to display an angular position adjustment screen (1). FIG. 12A is a diagram showing a state in which the angular position adjustment screen (1) is displayed on the display unit 50. FIG. 12B is a diagram showing the state of the machine tool 10 after an operation has been performed by the operator in accordance with the angular position adjustment screen (1).

On the angular position adjustment screen (1), as shown in FIG. 12A, the guidance display pane 72 displays an instruction "Move slowly the spindle up and down near the Z-axis position at which the tool is transferred between the grip and the spindle while observing a lateral movement (run-out) of the tool tip and check whether the tool can be transferred smoothly. Does the tool tip move laterally?" This display instructs the operator to move the spindle 14 up and down near the Z-axis position at which the tool is transferred between the grip 40 and the spindle 14, checking the lateral movement of the tool tip. The display further instructs the operator to confirm that the tool 16 is smoothly transferred between the grip 40 and the spindle 14 (without the tip of the tool 16 moving). When the tip of the tool 16 moves laterally, the operator is instructed to operate the [YES] button displayed in the function button display area 74. When the tip of the tool 16 does not move laterally, the operator is instructed to operate the [NO] button.

In the angular position adjustment screen (1), as shown in FIG. 12A, [YES] and [NO] buttons are displayed in the function button display area 74. When the touch panel display controller 66 recognizes an operator's touch to the [YES] button on the angular position adjustment screen (1), the current display transitions to the state SA2 (FIG. 4). When the touch panel display controller 66 recognizes an operator's touch to the [NO] button on the angular position adjustment screen (1), the current display transitions to a state S8 (FIG. 4).

Figure 13A:
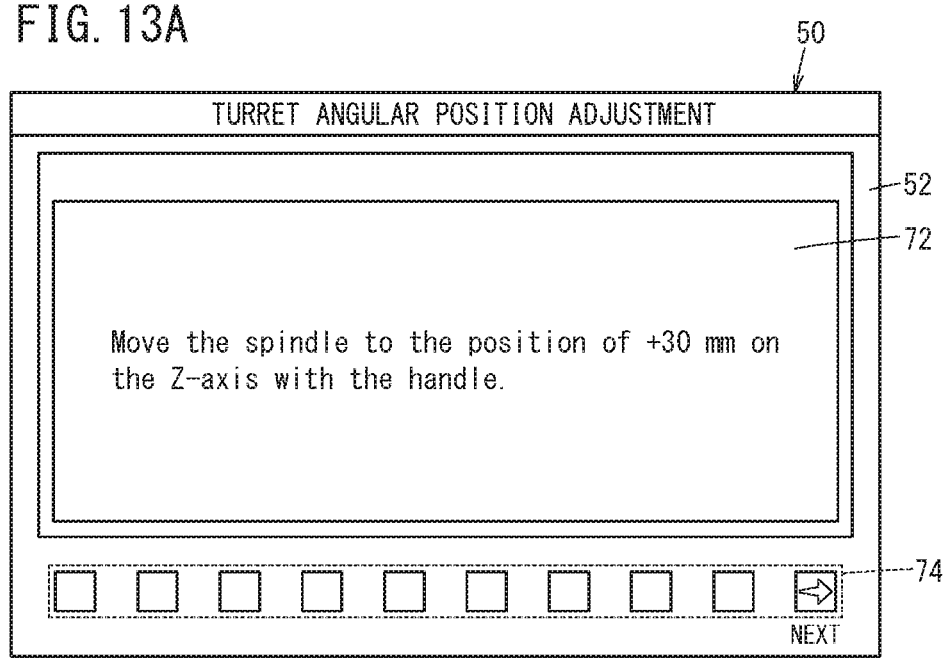
FIG. 13A is a diagram showing a state in which an angular position adjustment screen (2) is displayed on the display unit.
Figure 13B:
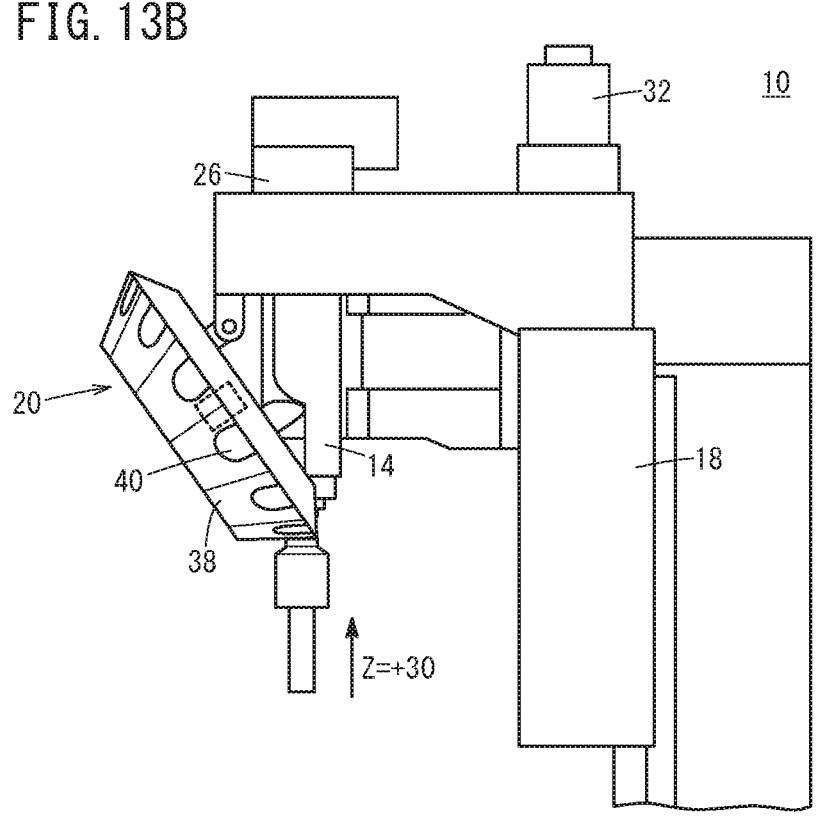
FIG. 13B is a diagram showing the state of the machine tool after an operation is performed by the operator based on the angular position adjustment screen (2)

In the state SA2, the touch panel display controller 66 causes the display unit 50 to display an angular position adjustment screen (2). FIG. 13A is a diagram showing a state in which the angular position adjustment screen (2) is displayed on the display unit 50. FIG. 13B is a diagram showing the state of the machine tool 10 after an operation has been performed by the operator in accordance with the angular position adjustment screen (2).

On the angular position adjustment screen (2), as shown in FIG. 13A, the guidance display pane 72 displays a message "Move the spindle to the position of +30 mm on the Z-axis with the handle". This display instructs the operator to operate the unillustrated handle provided for the machine tool 10 to move the spindle 14 to a position on the Z-axis where the angular position of the turret 38 can be adjusted (Z=around +30 mm). At this time, the tool 16 is held by the grip 40 and partly inserted in the mounting hole of the spindle 14 while the turret 38 can slightly turn.

On the angular position adjustment screen (2), as shown in FIG. 13A, a [NEXT] button is displayed in the function button display area 74. When the touch panel display controller 66 recognizes an operator's touch to the [NEXT] button on the angular position adjustment screen (2), the current display transitions to a state SA3 (FIG. 4).

Figure 14A:
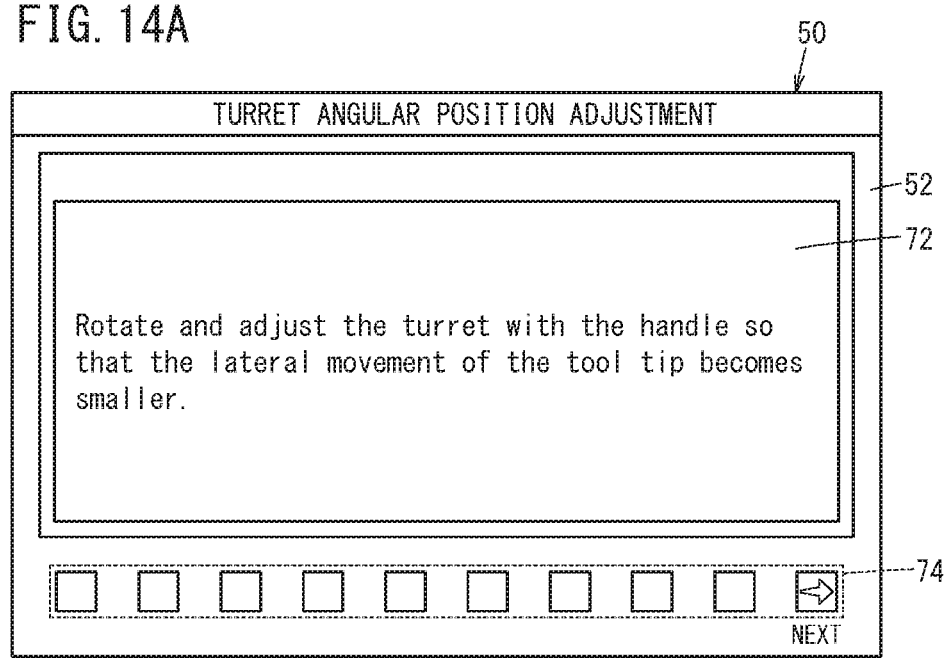
FIG. 14A is a diagram showing a state in which an angular position adjustment screen (3) is displayed on the display unit.
Figure 14B:
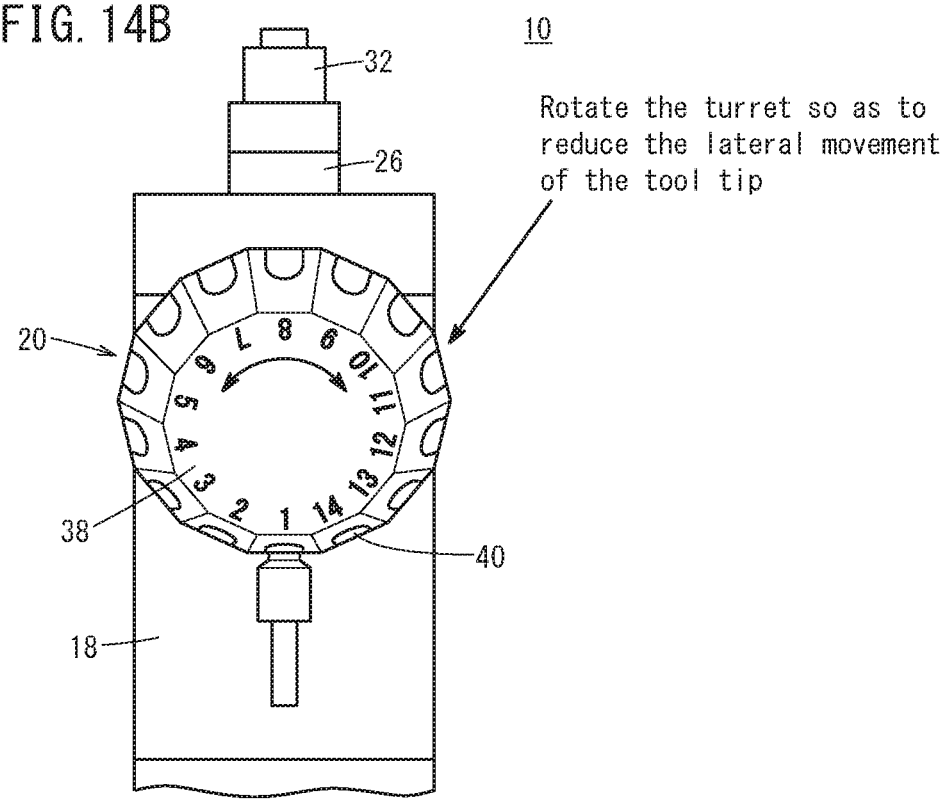
FIG. 14B is a diagram showing the state of the machine tool after an operation is performed by the operator based on the angular position adjustment screen (3)

In the state SA3, the touch panel display controller 66 causes the display unit 50 to display an angular position adjustment screen (3). FIG. 14A is a diagram showing a state in which the angular position adjustment screen (3) is displayed on the display unit 50. FIG. 14B is a diagram showing the state of the machine tool 10 after an operation has been performed by the operator in accordance with the angular position adjustment screen (3).

On the angular position adjustment screen (3), as shown in FIG. 14A, the guidance display pane 72 displays a message "Rotate and adjust the turret with the handle so that the movement of the tool tip becomes smaller". This display instructs the operator to operate the unillustrated handle provided for the machine tool 10 to turn the turret 38 so as to reduce the movement of the tip of the tool 16.

In the angular position adjustment screen (3), as shown in FIG. 14A, a [NEXT] button is displayed in the function button display area 74. When the touch panel display controller 66 recognizes an operator's touch to the [NEXT] button on the angular position adjustment screen (3), the current display switches to the state SA1 (FIG. 4).

As described above, when the touch panel display controller 66 recognizes an operator's touch to the [NO] button on the angular position adjustment screen (1) of the state SA1, the state transitions to the state S8.

Figure 15:
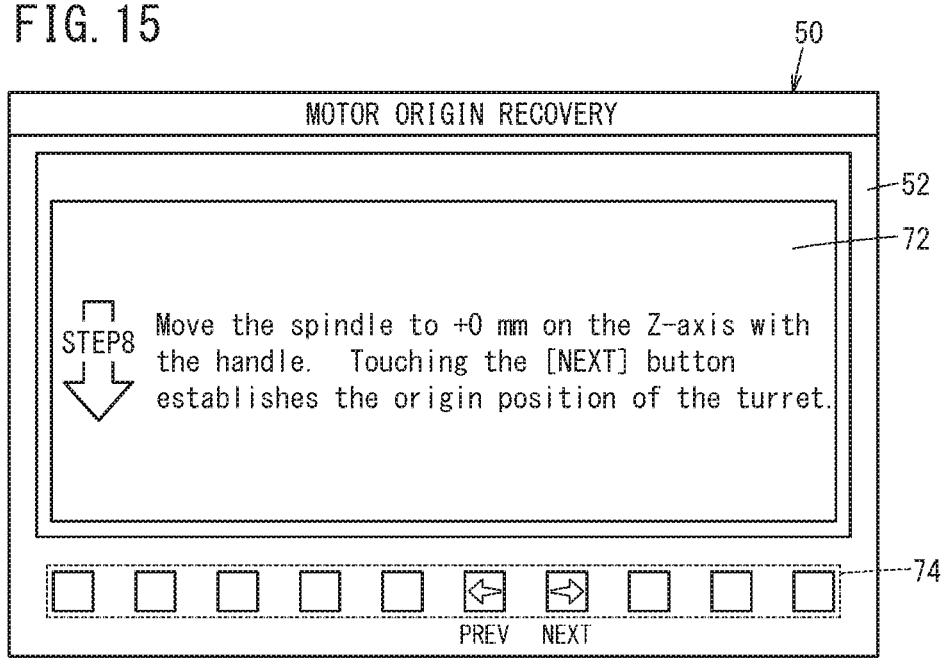
FIG. 15 is a diagram showing a state in which an origin recovery screen (8) is displayed on the display unit.

In the state S8, the touch panel display controller 66 causes the display unit 50 to display an origin recovery screen (8). FIG. 15 is a diagram showing a state where the origin recovery screen (8) is displayed on the display unit 50.

On the origin recovery screen (8), as shown in FIG. 15, the guidance display pane 72 displays "Move the spindle to +0 mm on the Z-axis with the handle. Touching the [NEXT] button establishes the origin position of the turret". This display instructs the operator to operate the unillustrated handle provided for the machine tool 10 to thereby set the spindle 14 at +0 mm on the Z-axis.

On the origin recovery screen (8), as shown in FIG. 15, [PREV] and [NEXT] buttons are displayed in the function button display area 74. Here, the [NEXT] button is not activated until the spindle 14 comes to the vicinity of the position of +0 mm on the Z-axis so that even if the [NEXT] button is operated by the operator, the touch panel display controller 66 will not recognize the operation of [NEXT] button.

When the touch panel display controller 66 recognizes an operator's touch to the [PREV] button on the origin recovery screen (8), the current display switches to the state S7 (FIG. 4). On the other hand, when the touch panel display controller 66 recognizes an operator's touch to the [NEXT] button on the origin recovery screen (8), the current display transitions to a state S9 (FIG. 4). At this time, the origin recovery unit 70 sets the current angular position of the turret 38 as the origin in the angular position calculator 64.

Figure 16:
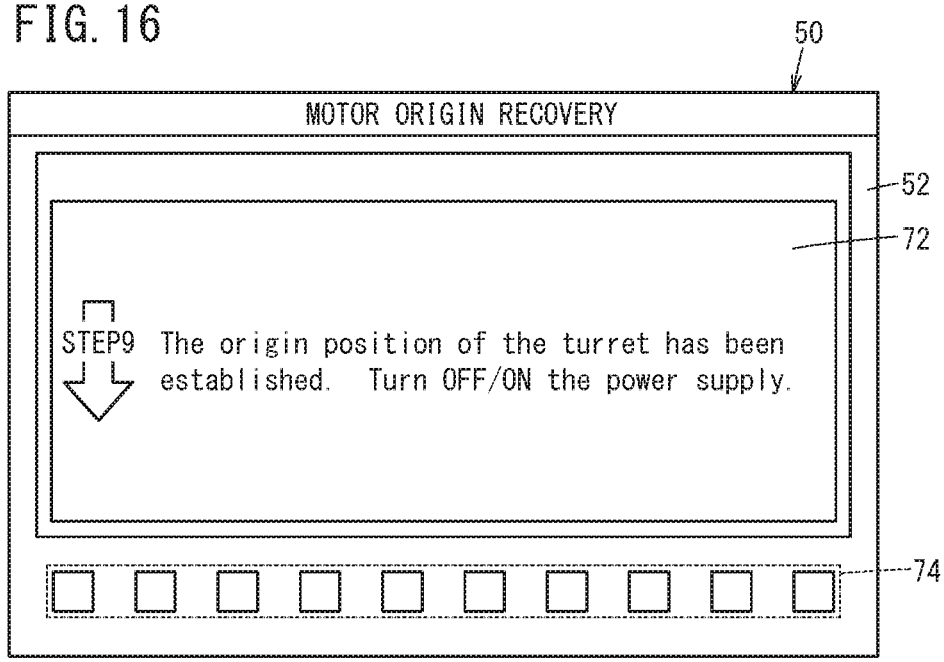
FIG. 16 is a diagram showing a state in which an origin recovery screen (9) is displayed on the display unit.

In the state S9, the touch panel display controller 66 causes the display unit 50 to display an origin recovery screen (9). FIG. 16 is a diagram showing a state where the origin recovery screen (9) is displayed on the display unit 50.

On the origin recovery screen (9), as shown in FIG. 16, the guidance display pane 72 displays a message "The origin position of the turret has been established. Turn off/on the power supply". This display notifies the operator that the origin position has been established by making the origin of the angular position of the turret 38 in the angular position calculator 64 coincident with the actual origin of the angular position of the turret 38. Further, the operator is instructed to turn off and then turn on the power supply.

When the touch panel display controller 66 recognizes an operator's touch to the reset button 30 in the states S6 to S8 or the states SA1 to SA3, the display transitions to a state SB1.

Figure 17:
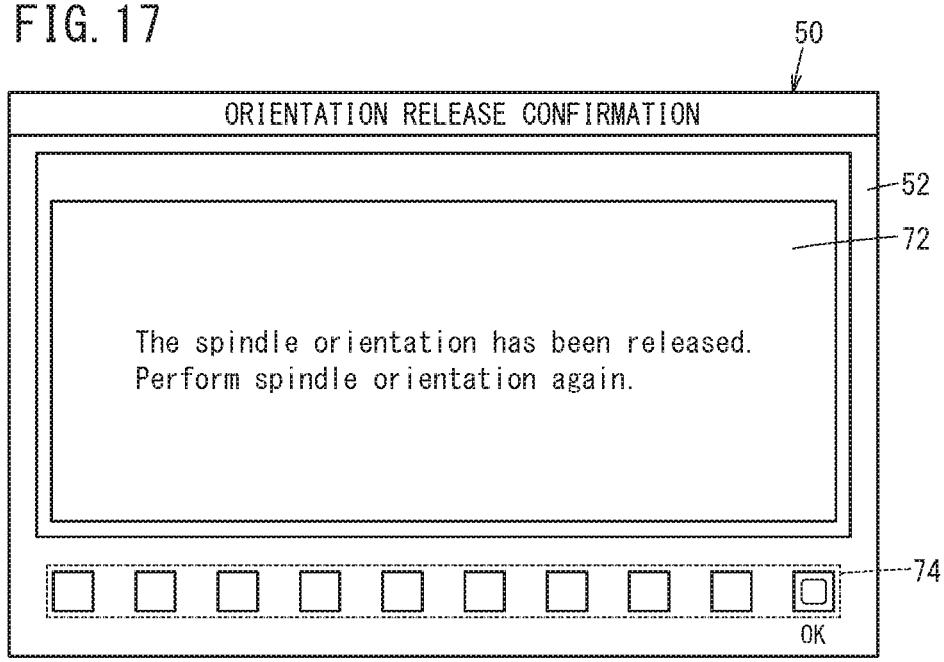
FIG. 17 is a diagram showing the state of a screen displayed on the display unit when spindle orientation is canceled.

In the state SB1, the touch panel display controller 66 causes the display unit 50 to display a spindle orientation release screen. FIG. 17 is a diagram showing a state in which the spindle orientation release screen is displayed on the display unit 50.

On the spindle orientation release screen, as shown in FIG. 17, the guidance display pane 72 displays a message "The spindle orientation has been released. Perform the spindle orientation again". This display notifies the operator of the release of spindle orientation.

On the spindle orientation release screen, as shown in FIG. 17, an [OK] button is displayed in the function button display area 74. When the touch panel display controller 66 recognizes an operator's touch to the [OK] button on the spindle orientation release screen, the display transitions to the state S5 (FIG. 4).

[Operation and Effect]

When performing the origin recovery, the operator manually performs the angular position adjustment so that a predetermined angular position of the turret 38 is the origin, then in the angular position calculator 64 the origin recovery unit 70 sets, as the origin, the angular position of the turret 38 that has undergone the angular position adjustment. However, this task has been difficult for the operator because the origin recovery is not frequently performed and the procedure of the angular position adjustment is complicated.

On the other hand, in the present embodiment, guidance showing the procedure of the angular position adjustment is displayed on the display unit 50. Specifically, the display unit 50 is controlled to display guidance such as to instruct the operator to move the spindle 14 up and down near the Z-axis position at which the tool is transferred between the grip 40 and the spindle 14 and to observe the lateral movement of the tool tip at the same time. When the tip of the tool 16 moves sideways, the display unit 50 displays guidance to instruct the operator to raise the spindle 14. Next, guidance is displayed on the display unit 50 to instruct the operator to turn the turret 38 so as to reduce the movement of the tip of the tool 16. Thus, since the procedure of the angular position adjustment is specifically displayed on the display unit 50, it is possible to provide information on the angular position adjustment so that the operator can easily set the predetermined angular position of the turret 38 as the origin.

Further, in the present embodiment, before displaying the above guidance, the display unit 50 displays guidance so as to instruct the operator to remove all the tools 16 attached to the grips 40 on the turret 38. Then, the display unit 50 instructs the operator to attach a tool 16 designed for the angular position adjustment of the turret 38 to the reference grip 40 of the turret 38. As a result, it is possible to adjust the angular position of the turret 38 to a position closer to the origin.

[Technical Ideas Obtained from the Embodiment]

Technical ideas that can be grasped from the above embodiment will be described below.

The guidance display method of causing the display unit (50) to display instructions for the angular position adjustment method for adjusting the predetermined angular position of the turret (38) provided with a plurality of grips (40) holding the tool (16) so that the predetermined angular position becomes the predetermined origin, includes: the first step of causing the display unit (50) to display such guidance as to instruct the operator to move the spindle (14) up and down near the position at which the tool (16) is transferred between the predetermined grip of the grips (40) and the spindle (14) and to observe runout the tip of the tool (16); when the runout of the tip of the tool is observed, the second step of causing the display unit (50) to display such guidance as to instruct the operator to raise the spindle (14) up to the turret rotatable position where the turret (38) rotates while the tool attached to the turret does not interference with the spindle (14); and the third step of causing the display unit (50) to display such guidance as to instruct the operator to turn the turret (38) so as to reduce the runout of the tip of the tool (16). Thus, the procedure of angular position adjustment is specifically displayed on the display unit (50), so that information is provided that enables the operator to easily perform angular position adjustment so as to set the predetermined angular position of the turret (38) as the origin.

The above guidance display method may further include: a fourth step of causing the display unit (50) to display such guidance as to instruct the operator to remove all the tools (16) attached to the grips (40) of the turret (38) prior to the first step; and a fifth step of causing the display unit (50) to display such guidance as to instruct the operator to attach a tool (16) designed for angular position adjustment of the turret (38) to the predetermined grip (40) on the turret (38) after the fourth step. This makes it possible to adjust the predetermined angular position of the turret (38) to a position closer to the origin.

It should be understood that the present invention is not limited to the above-described embodiment, and various alternative or additional configurations could be adopted therein based on the disclosed content of the present specification.

What is claimed is:

1. A guidance display method of causing a display unit operatively coupled to a turret provided with a plurality of grips, each grip capable of holding a tool to display instructions for an angular position adjustment method for adjusting a predetermined angular position of the turret so that the predetermined angular position becomes an origin, comprising:

providing a processor programmed to cause the display unit to display the following steps:

displaying a first step on the display unit to instruct an operator to move a spindle up and down near a position at which the tool is transferred between a predetermined grip of the plurality of grips and the spindle and to observe runout of a tool tip, and when the operator confirms that runout of the tool tip is observed by operating a button on the display unit, automatically displaying a second step on the display unit to instruct the operator to raise the spindle up to a turret rotatable position where the turret rotates while the tool attached to the turret does not interfere with the spindle; and displaying a third step on the display unit, after the operator has raised the spindle up according to the second step, to instruct the operator to turn the turret so as to reduce the runout of the tool tip.

2. The guidance display method according to claim 1, further comprising:

displaying a fourth step on the display unit to instruct the operator to remove all the tools attached to the grips of the turret prior to the first step; and displaying a fifth step on the display unit to instruct the operator to attach a tool designed for angular position adjustment of the turret to the predetermined grip on the turret after the fourth step.

* * * * *